United States Patent [19]

Kurihara

[11] Patent Number: 4,899,856

[45] Date of Patent: Feb. 13, 1990

[54] FREE WHEEL HUB APPARATUS

[75] Inventor: Sakuo Kurihara, Tochigi, Japan

[73] Assignee: Tochigifujisangyo Kabushiki Kaisha, Tochigi, Japan

[21] Appl. No.: 390,442

[22] Filed: Jul. 31, 1989

Related U.S. Application Data

[63] Continuation of Ser. No. 195,199, May 18, 1988, abandoned.

[30] Foreign Application Priority Data

May 26, 1987 [JP] Japan .............................. 62-078182[U]

[51] Int. Cl.$^4$ ...................... B60K 41/02; F16D 11/00; F16D 27/09
[52] U.S. Cl. ............................. 192/0.02 R; 192/67 R; 192/84 R
[58] Field of Search ...................... 192/0.02 R, 50, 49, 192/67 R, 84 R; 403/1; 180/233

[56] References Cited

U.S. PATENT DOCUMENTS

| | | | |
|---|---|---|---|
| 4,266,646 | 5/1981 | Telford | 192/67 R |
| 4,291,791 | 9/1981 | Goto et al. | 192/67 R |
| 4,293,061 | 10/1981 | Brown | 192/67 R |
| 4,534,455 | 8/1985 | Fujikawa | 192/67 R X |
| 4,627,512 | 12/1986 | Clohessy | 192/85 V X |
| 4,718,527 | 1/1988 | Kurihara | 192/67 R X |
| 4,766,985 | 8/1988 | Brusasco | 192/0.02 R |
| 4,776,441 | 10/1988 | Kagata et al. | 192/0.02 R |

FOREIGN PATENT DOCUMENTS

| | | | |
|---|---|---|---|
| 37340 | 2/1984 | Japan . | |
| 143737 | 6/1987 | Japan . | |
| 2055998 | 3/1981 | United Kingdom | 192/35 |

Primary Examiner—Rodney H. Bonck
Attorney, Agent, or Firm—Samuels, Gauthier, Stevens & Kehoe

[57] ABSTRACT

A free wheel hub apparatus comprises a drive gear engaged with a drive shaft and having a gear portion on the outer circumferential face thereof; a housing disposed outside the drive gear and fixed to a wheel hub and having a gear portion on the inner circumferential face thereof; a slide gear engaged with the gear portions of the housing and the drive gear and movable in the axial direction; a drive device for moving the slide gear in the axial direction to engage and disengage the gear portions from each other; and a controller for controlling the operation of the drive device.

8 Claims, 3 Drawing Sheets

FREE WHEEL HUB APPARATUS

This is a continuation of copending application Ser. No. 195,199, filed on May 18, 1988 and now abandoned.

The present invention relates to a free wheel hub apparatus such as a free wheel hub clutch used in a part-time 4WD vehicle.

BACKGROUND OF THE INVENTION

In a part-time 4WD vehicle for switching two wheel drive and four wheel drive, for example, in the case of the two wheel drive by only rear wheels, front wheels and a front axle shaft are spline-engaged with each other, so that a front drive system including the front axle shaft, differential gears and propeller shafts operatively connected to the front wheels is rotated in accordance with the running of the vehicle, thereby reducing life of seal members and increasing noise and fuel cost. To solve these problems, in a free wheel hub clutch, the front wheels and the front axle shaft are separated from each other in the case of the two wheel drive to stop the idle running of the front drive system, and a hub clutch disposed in the front wheels is coupled as a locking state in the case of the four wheel drive.

A means for coupling and decoupling the hub clutch is constituted by a device mechanically operated manually or automatically, a device operated by fluid as an operating source, a device operated by vacuum or magnetic force, etc. For example, a device operated by fluid is disclosed in U.S. Pat. No. 4,293,061 in which a clutch mechanism can be freely coupled and decoupled by fluid pressure through a drive apparatus. A device operated by vacuum is disclosed in U.S. Pat. No. 4,627,512 in which an intake manifold of an engine is connected to an airtightly sealed chamber through a conduit, and the sealed chamber is controlled in a vacuum state or an atmosphere opening state, freely coupling and decoupling the clutch mechanism disposed within the sealed chamber. A device operated by an electromagnet is disclosed in Japanese Laid-Open Patent 59-37340 in which a clutch mechanism is freely coupled or decoupled by attracting force of an electromagnetic coil. Further, in Japanese Laid-Open Patent 62-143737, a motor is disposed in a wheel hub, and a rotary shaft of the motor is located in a place apart from the rotary center of the wheel when the vehicle is running so that the motor is not smoothly operated and the unbalance in rotation of the motor is caused by the difference in weight of the place where the motor is located.

However, when the switching operation of the conventional hub clutch is manually performed mechanically, an operator must move away from an operating room to operate the hub clutch. When the switching operation of the hub clutch is automatically performed mechanically, the coupling of the clutch is released once when the clutch is switched to move the vehicle forwards or backwards. Accordingly, the driver cannot rapidly drive the vehicle out of a road having a very bad condition. Further, noises tend to be generated by wearing of members at the operating time thereof, reducing the durability of the apparatus.

When fluid or vacuum is used as an operating source, it is necessary to dispose pipings maintained in a an airtightly sealed state so that it is necessary to reliably hold seal, causing problems with respect to maintenance in function. In particular, some problems are caused by wearing of members with respect to reliability of rotary portions thereof. When a magnetic force is used as an operative source, the magnetic force is rapidly reduced in accordance with distance so that it is necessary to dispose a strong electromagnet, increasing the size of the apparatus. Further, it is necessary to flow an electric current at any time to maintain at least a four wheel drive state, thereby increasing power consumption and causing problems in reliability of the apparatus.

SUMMARY OF THE INVENTION

To overcome the problems mentioned above, an object of the present invention is to provide a free wheel hub apparatus which is compact and reliable.

Another object of the present invention is to provide a free wheel apparatus clutch which is easily operated without any special sealing members.

With the above objects in view, the present invention resides in a free wheel hub apparatus comprising a drive gear means engaged with a drive shaft and having a gear portion on the outer circumferential face thereof; a housing disposed outside the drive gear means and fixed to a wheel hub and having a gear portion on the inner circumferential face thereof; a slide gear means engaged with the gear portions of the housing and the drive gear means and movable in the axial direction; drive means for moving the slide gear means in the axial direction to engage and disengage the gear portions from each other; and means for controlling the operation of the drive means.

BRIEF DESCRIPTION OF THE DRAWINGS

The present invention will be more apparent from the following description of the preferred embodiments thereof in conjunction with the accompanying drawings in which.

DETAILED DESCRIPTION OF THE PREFERRED EMBODIMENTS

The preferred embodiments of the present invention will be described in detail with reference to the accompanying drawings.

Figure 1:
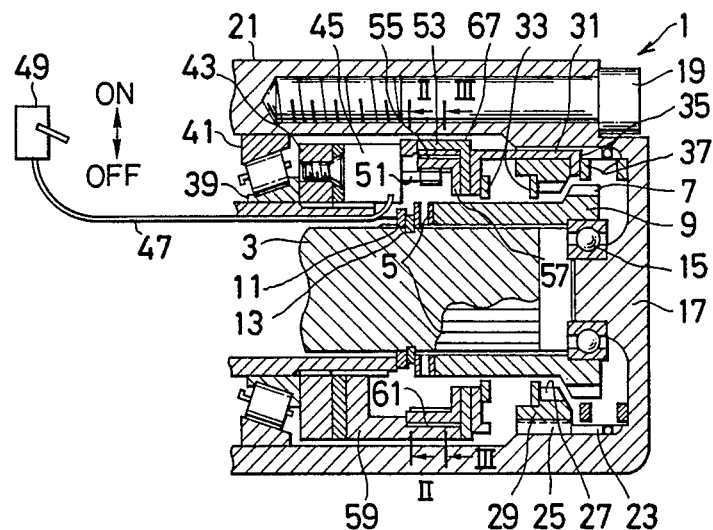
FIG. 1 is a cross-sectional view showing a free state of a free wheel hub clutch in accordance with a first embodiment of the present invention.
Figure 2:
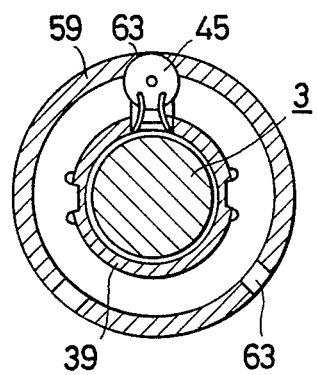
FIG. 2 is a cross-sectional view taken along line II—II of FIG. 1.
Figure 3:
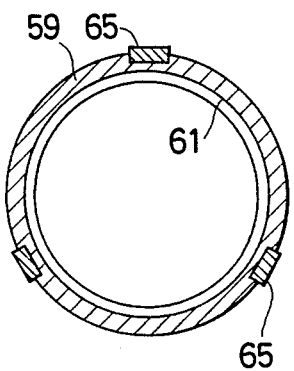
FIG. 3 is a cross-sectional view taken along line III-—III of FIG. 1.
Figure 4:
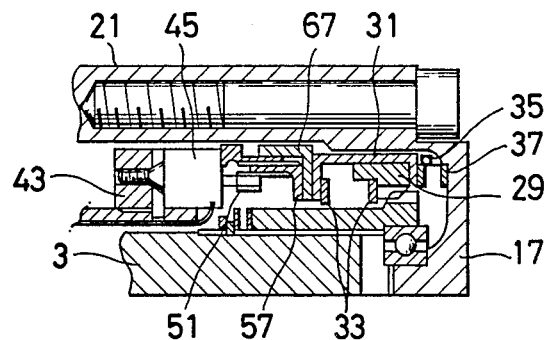
FIG. 4 is a cross-sectional view showing a locking state of the clutch.

FIG. 1 shows a free state of a free wheel hub clutch in accordance with a first embodiment of the present invention. FIG. 4 shows a locking state of the clutch.

In these figures showing a hub clutch 1, a drive gear 9 is connected to a spline 5 disposed in a drive shaft 3 in an inner circumferential portion of the drive gear, and is provided with a gear portion 7 in an outer circumferential portion thereof. The drive gear 9 is biased at any time towards an end tip side thereof(on the right hand side in FIG. 1) by a spring 13 between a receiving plate 11 disposed in the drive shaft 3 and the drive gear 9, thereby absorbing rattles between constructional members.

A bearing 15 is disposed at an end of the drive gear 9, and a housing 15 rotatably supported by the bearing 17 is fixed to a wheel hub 21 by a fastening bolt 19.

A slide gear 29 is engaged with the gear portion 7 disposed in an outer circumferential portion of the drive gear 9, and spline teeth 23 disposed in an inner circumferential portion of the housing 17. The slide gear 29 is provided with spline teeth 25 on the outer circumferential surface thereof movable in the axial direction, and a gear portion 27 on the inner circumferential surface thereof. The slide gear 29 is disposed in a plurality of portions on the tip side (on the right hand side of FIG. 1) of a retainer 31 by a shift spring 33 disposed within the retainer 31, and is biased to come in contact with a claw portion 35 extending in the inner radial direction.

A return spring 37 is disposed between a side of the claw portion 35 and an inner side of the housing 17 to return the slide gear 29 to the original position thereof through the retainer 31. The spline teeth 25 disposed on the outer circumferential surface of the slide gear 29 are engaged with the spline teeth 23 of the housing 17, but there are no teeth in a portion thereof into which the claw portion 35 of the retainer 31 is inserted, thereby stopping the rotation of the retainer 31.

A nut 43 is a member for fixing a bearing 41 disposed in a spindle 39 on a chassis side which is stationary and is not rotated, and is fixed to an electric motor 45 such as a direct current motor driven in normal and reverse rotational directions. A change-over switch 49 for turning on and off the motor through a lead wire 47 is disposed as a control system of the electric motor 45 within the chassis.

A pinion 51 is integrally disposed in an output shaft of the electric motor 45, and an actuator 57 is provided with a gear 53 engaged with the pinion 51 on the inner circumferential surface thereof and has a male screw 55 on the outer circumferential surface thereof. The actuator 57 is engaged with a female screw 61 disposed on the inner circumferential surface of a flange 59 integrally engaged with the spindle 39 on the chassis side. Accordingly, the actuator 57 is rotated by the rotation of the electric motor 45, and can be moved by the screws 55 and 61 rightwards and leftwards in the axial direction.

An axially movable intermediate seat 67 is in slide contact with a rear face(the right hand side of FIG. 1) of the actuator 57, and is provided with claw portions 65 inserted into a plurality of recessed portions 63 disposed in outer circumferential portions of the flange 59. The retainer 31 contacts an other face of the intermediate seat 67, and the retainer 31 can move rightwards and leftwards by the axial movement of the actuator 57. The intermediate seat 67 is not rotated.

In the operation of the structure mentioned above, when the change-over switch 49 disposed in the vehicle is operated and the electric motor 45 is rotated in the normal direction, the actuator 57 is rotated through the pinion 51 and the gear 53 and moves forwards(in the right direction of FIG. 1) by the male and female screws 55 and 61 engaged between the actuator 57 and the flange 59 disposed on the stationary side, and the retainer 31 also moves forwards through the intermediate seat 67 against the resilient force of the return spring 37.

The slide gear 29 is held by the shift spring 33 within the retainer 31 so that the gear portions 27 and 7 disposed in the slide gear 29 and the drive gear 9 are engaged with each other by the forward movement of the retainer 31, resulting in a locking state shown in FIG. 4 from a free state shown in FIG. 1.

When the phases in engaging position of the gears are not in agreement with each other, it becomes a preset state once in which a standby mechanism is operated, and the gears are engaged with each other by the pressure of the shift spring 33 when the phases are in agreement with each other by the rotation of the gears thereafter.

When the locking state shown in FIG. 4 is changed to the free state shown in FIG. 1, the switching operation is performed by the reverse rotation of the electric motor 45 by the change-over switch 49, which is reverse to the above operation.

As mentioned above, a lot of parts used in the conventional hub clutch can be used as constructional elements of the present invention, and the number of constructional members is reduced and the apparatus can be made compact and reliable.

Further, the clutch can be controlled in the interior of the vehicle, improving the operability.

Figure 5:
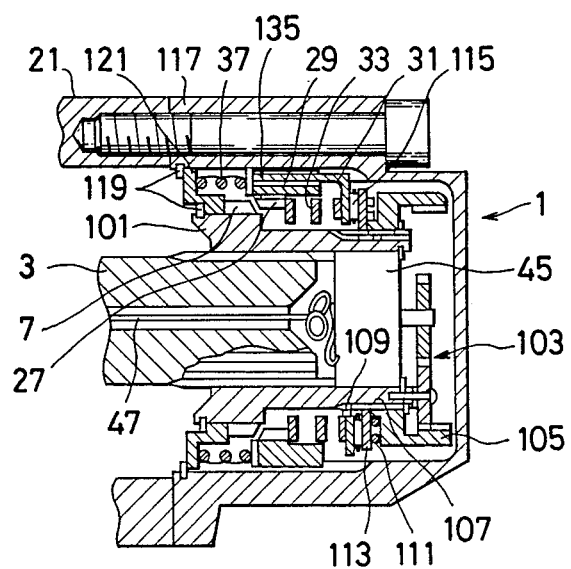
FIG. 5 is a cross-sectional view showing a free state of a free wheel hub clutch in accordance with a second embodiment of the present invention.
Figure 6:
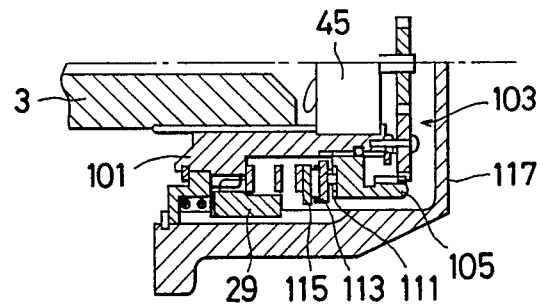
FIG. 6 is a cross-sectional view showing a locking state of the clutch in the second embodiment of the present invention.

FIGS. 5 and 6 show a second embodiment of a hub clutch of the present invention, and respectively show a free state and a locking state. In FIGS. 5 and 6, the same or corresponding portions as those in the first embodiment are designated by the same reference numerals. FIGS. 5 and 6 show an embodiment in which an electric motor is embedded into a drive shaft system, i.e., onto a member side resting in the free state of the hub clutch.

The electric motor 45 is fixed into a drive gear 101 spline-connected to the drive shaft 3, and has an output shaft for rotating an actuator 105 through a plurality of gears 103. A female screw 107 disposed on the inner circumferential face of the actuator 105 is engaged with a male screw 109 disposed on the outer circumferential face of the drive gear 101 so that the actuator 105 is axially moved by the rotation of the electric motor 45.

A thrust bearing 111 is in slide contact with a rear face(on the left hand side of FIG. 5) of the actuator 105, and is also in slide contact with an axially movable intermediate seat 113 engaged with the drive gear 101 in the rotational direction. A thrust bearing 115 is disposed between the intermediate seat 113 and the retainer 31. A shift spring 33 is disposed within the retainer 31 such that a slide gear 29 is pressed leftwards from the retainer 31. A washer 135 contacts an end portion of the retainer 31 and an end face of the slide gear 29. A centering member 121 is engaged with stoppers 119 respectively disposed in the housing 117 and the drive gear 101, and performs the centering operation of the drive gear 101 with respect to the housing 117 and restricts the axial movement of the drive gear 101. A return spring 37 is disposed between the washer 135 and the centering member 121.

In the construction mentioned above, the electric motor 45 is rotated by the operation of an unillustrated change-over switch disposed in the interior of a vehicle, the actuator 105 is rotated and the rotational movement thereof is converted by screws 107 and 109 to a linear movement so that the slide gear 29 is moved forwards(in the left direction of FIG. 5) against the resilient force of the return spring 37. Thus, the gear portions 27 and 7 of the slide gear 29 and the drive gear 101 are engaged with each other, resulting in a locking state shown in FIGS. 5 and 6.

In the structure of this type, the thrust bearing 111 and 115 are embedded between rotary members so that the power is smoothly transmitted with less resistance, and there are less members rotated by the rotation of the wheel hub in the free state. Since the electric motor 45 is rotated, the connection point between the motor and a lead wire 47 is of a slip ring type.

Figure 7:
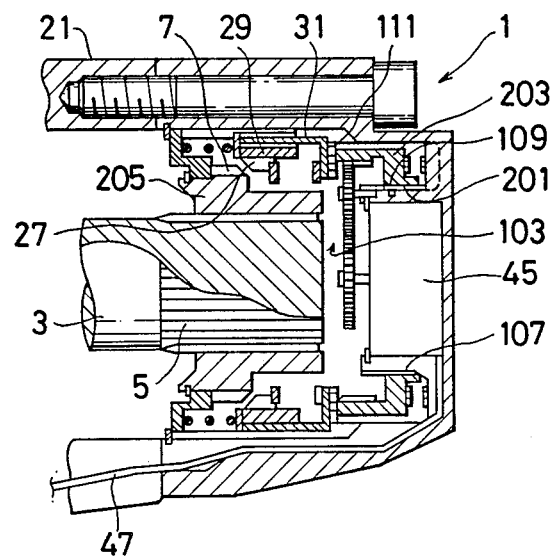
FIG. 7 is a cross-sectional view showing a free state of a hub clutch in accordance with a third embodiment of the present invention.

FIG. 7 shows the free state showing a hub clutch in accordance with a third embodiment of the present invention.

In this embodiment, an electric motor 45 is embedded into a rotary member rotated at any time, i.e., onto the side of the housing 201 of the wheel hub 21. The electric motor 45 disposed in the housing 201 rotates an actuator 203 through gears 103, and the rotational movement thereof is converted into a linear movement by engaging a female screw 107 disposed on the inner circumferential face of the actuator 203 and a male screw 109 disposed in the housing 201 with each other, thereby moving the actuator 203 in the axial direction.

A thrust bearing 111 is disposed between the actuator 203 and a retainer 31, and the slide gear 29 is moved by the movement of the actuator 203, thereby engaging and disengaging spline teeth 27 of the slide gear 29 and spline teeth 7 of the drive gear 205 from each other. The same or corresponding portions as those in the former embodiments are designated by the same reference numerals.

The structure of this type has features that the power is smoothly transmitted by the arrangement of the thrust bearing 111.

The present invention is not limited to the embodiments mentioned above, but may be changed in various modifications within the scope of the invention.

As mentioned above, in the present invention, the rotary movement of gears from an electric motor fixed to a spindle on the vehicle side, for example, is converted, by the operation of a change-over switch disposed in the interior of the vehicle, into a linear movement through an actuator, thereby moving a slide gear in the axial direction. The axis of a rotary shaft of the motor is in agreement with the rotary central axis of the hub or a stationary system. The free and locking states of the hub clutch can be provided by the axial movement of the slide gear. Accordingly, the reliability of the clutch can be obtained while the whole size of the clutch is made compact, and the cost thereof is reduced.

Further, in accordance with the present invention, the slide gear for connecting and disconnecting power of the free wheel hub clutch is moved by the actuator and the electric motor. Accordingly, the number of constructional elements in the clutch is reduced, and the mechanical reliability is improved, and it is not necessary to consider any special seal since no fluid is used as an operating source, and the clutch is easily operated in the interior of a vehicle, and less electric current is used.

What is claimed is:

1. A free wheel hub apparatus, comprising:
    a housing member;
    a drive shaft disposed within the housing;
    a drive gear connected to the drive shaft;
    a slide gear slidably connected to the housing, the slide gear being slidably engageable with the drive gear so as to transmit rotational force to the housing; and
    means for sliding the slide gear into engagement with the drive gear, the sliding means comprising an electric motor having an output shaft and means for converting rotational force of the output shaft into an axially directed force to act on the slide gear, the converting means and the slide gear being arranged axially between the electric motor and the drive gear.

2. The free wheel hub apparatus of claim 1, wherein the output shaft of the motor has a pinion disposed thereon, and the converting means comprises an actuator provided with a first gear engaged with the pinion.

3. The free wheel hub apparatus of claim 2, further comprising a retainer slidably connected to the housing for holding the slide gear.

4. The free wheel hub apparatus of claim 3, wherein the sliding means acts on the slide gear by imparting axially directed force to the retainer via an intermediate seat disposed between the actuator and the retainer.

5. The free wheel hub apparatus of claim 4, wherein the drive gear is spline-engaged with the drive shaft.

6. The free wheel hub apparatus of claim 5, wherein the slide gear is slidably spline-engaged with the housing.

7. The free wheel hub apparatus of claim 6, wherein a bearing is disposed between the drive gear and the housing to provide a rotatable support therebetween, and the drive shaft is provided with a spring for biasing the drive gear towards the bearing.

8. The free wheel hub apparatus of claim 7, further comprising control means remote from the housing for operating the sliding means.

* * * * *